United States Patent [19]

Andrei

[11] 4,156,631
[45] May 29, 1979

[54] KETTLE DISTILLING UNIT

[76] Inventor: Wesley Andrei, Box 30, Ebenezer, Canada, S0A 0T0

[21] Appl. No.: 812,585

[22] Filed: Jul. 5, 1977

[51] Int. Cl.² ............................................. B01D 3/02
[52] U.S. Cl. ............................... 202/185 C; 202/192; 202/193
[58] Field of Search ............ 202/185 C, 189, 190–193

[56] References Cited

U.S. PATENT DOCUMENTS

| | | | |
|---|---|---|---|
| 662,765 | 11/1900 | Chase | 202/190 |
| 806,450 | 12/1905 | Barnstead | 202/193 |
| 825,178 | 7/1906 | Barnstead | 202/190 |
| 1,323,223 | 11/1919 | Jones | 202/185 C |
| 1,432,136 | 10/1922 | Tashima | 202/190 |
| 2,254,538 | 9/1941 | Newman | 202/193 |
| 2,398,842 | 4/1946 | Morse | 202/189 |
| 2,816,064 | 12/1957 | Smith | 202/189 |

*Primary Examiner*—Hiram H. Bernstein
*Attorney, Agent, or Firm*—Stanley G. Ade

[57] ABSTRACT

A casing is supported above a kettle such as an electric kettle or the like and contains a condensing unit or coil connected to a source of cooling water. Steam from the kettle passes upwardly through the coil and into the casing and is condensed and collected at the base and discharged as distilled water. A feed from the heated cooling water replenishes the water supply in the kettle and may be automatic if desired.

11 Claims, 7 Drawing Figures

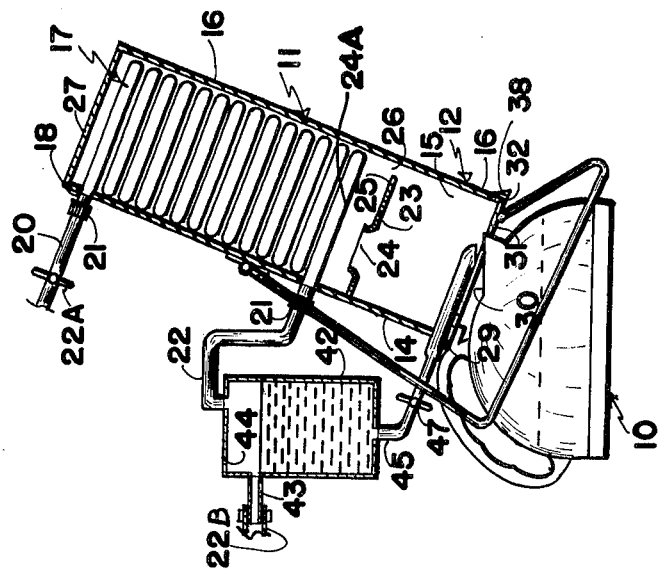
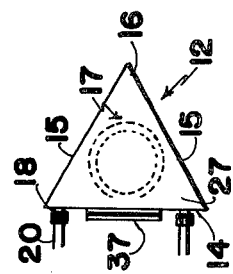
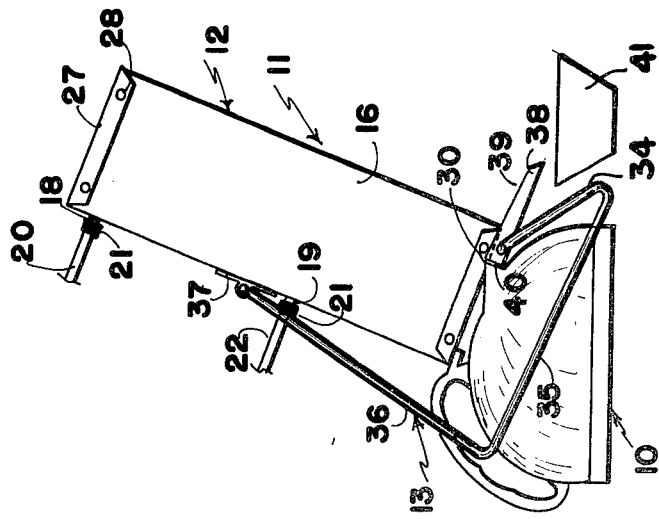

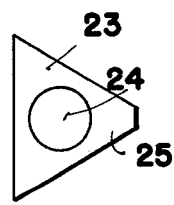
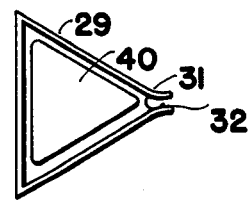
FIG. 4  FIG. 5
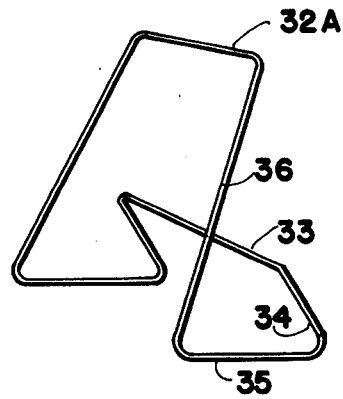
FIG. 6
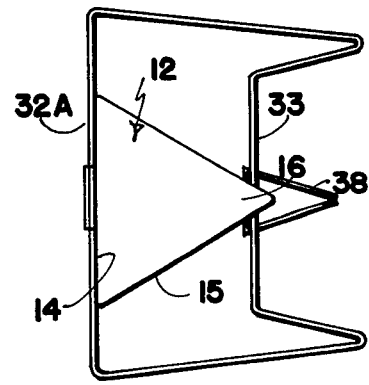
FIG. 7

KETTLE DISTILLING UNIT

BACKGROUND OF THE INVENTION

This invention relates to new and useful improvements in distilling units, particularly distilling units designed for home use where portable water supplies are not always available.

It is well known that many rural areas as well as small town areas often have somewhat uncertain water qualities. Not only may the water supply be unsafe but even when it is considered safe, it is often unpleasant due to chemicals present therein.

Many commercial distilling units have been used in an attempt to provide a safe, pleasant and portable water supply particularly to homes but these are relatively expensive and usually utilize a source of electrical power connected directly to the distillation unit.

SUMMARY OF THE INVENTION

The present invention provides a relatively inexpensive simple distillation unit which can be used with a source of boiling water or the like such as a kettle which may be heated electrically or otherwise as desired.

The kettle includes a spout through which steam is discharged when water within the kettle is heated and a source of circulating cooling water is provided. The unit comprises an enclosure with means to support the enclosure whereby same extends upwardly above the associated spout of the kettle. Steam entry means are provided at the base of the enclosure for receiving steam from the spout and the upper end of the enclosure is closed. A condensing coil is supported within the enclosure above the steam entry means and means are provided to operatively connect the condensing coil to the source of circulating cooling water. Means are provided to collect condensate from the condensing coil, at the base of the enclosure and to discharge same therefrom.

An object of the invention is therefore to provide a distilling unit which contains no moving parts and which can be supported over a source of steam such as that provided by a kettle or other heated water container.

A still further object of the invention is to provide a device of the character herewithin described which may include an automatically regulated water supply for the kettle to replace water evaporated therefrom.

A yet further object of the invention is to provide a device of the character herewithin described which eliminates the usual sealed boiler with the associated relief valve thus making a safer unit particularly for home use.

Still another object of the invention is to provide a device of the character herewithin described in which the source of boiling water can be use for other purposes when the distillation unit is not in use.

A still further object of the invention is to provide a device of the character herewithin described which is adapted to be used with a variety of makes of kettles due to the limited adjustability provided between the unit and the supporting stand therefor.

A still further object of the invention is to provide a device of the character herewithin described which eliminates the requirements for cooling fans and other moving parts.

Yet another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a side elevation of the device shown in use with an associated electric kettle.

FIG. 2 is a top plan view of the device with the kettle and stand removed for clarity.

FIG. 3 is a view similar to FIG. 1 but showing the device partially sectioned to show the interior thereof.

FIG. 4 is a top plan view of the intermediate baffle per se.

FIG. 5 is a top plan view of the base per se.

FIG. 6 is an isometric view of the stand per se.

FIG. 7 is a view similar to FIG. 2 but showing the stand and spout included therewith.

In the drawings like characters of reference indicate corresponding parts in the different figures.

DETAILED DESCRIPTION

Proceeding therefore to describe the invention in detail, reference character 10 shows a conventional electric kettle which is used as a source of steam for the unit which is collectively designated 11.

However it will of course be appreciated that the source of steam can be any other form of kettle or other vessel which can supply steam from water heated therein.

The unit collectively designated 11, includes an enclosure collectively designated 12 and a stand collectively designated 13, to support the enclosure above the kettle 10.

In this embodiment, the enclosure is triangular when viewed in plan although of course the configuration of this enclosure can be circular, square or any other convenient configuration.

The enclosure includes a rear wall 14 and a pair of side walls 15 extending from the side edges of the rear wall 14 and converging to a common angle 16 constituting the front of the enclosure.

A condensing oil collectively designated 17 is situated within the enclosure and comprises a coil of tubing such as copper tubing or the like the diameter of which is preferably as large as will conveniently fit within the enclosure 12.

It is supported by an inlet nipple 18 and an outlet nipple 19 both of which extend through the rear wall of the enclosure and may be secured thereto either by soldering or any other conventional method thus supporting the coil 17 within the major or upper portion of the enclosure as clearly shown in FIG. 3.

A flexible conduit 20 is secured to the inlet nipple 18 by means of a hose clamp 21 and a similar conduit 22 is secured to the outlet nipple 19 by means of a similar hose clamp 21.

A control valve 22A may be provided in the flexible hose 20 which is connected to a source of cold water, usually a kitchen tap or the like (not illustrated).

The outlet conduit 22 constitutes a waste water outlet and may be connected to a covenient disposal such as a sink or similar means.

An upper baffle 23 spans the enclosure just below the base 24A of the condensing coil 17 and is secured to the walls of the enclosure as by spot welding or other similar means (not illustrated) a substantially circular funnel type aperture 24 is provided within this baffle 23 immediately below the condensing coil 17 with the diameter of this aperture preferably being slightly less than the internal diameter of the condensing coil in order to funnel steam upwardly through the coil as will hereinafter be described.

It will be noted that the front angle area 25 of this baffle 23 is apertured as at 26 or may be removed as shown in FIG. 4 to form a connection between the internal angle 16 of the enclosure, above and below the baffle 23, the purpose of which will hereinafter become apparent.

The upper end of the enclosure is closed by means of a cap 27 which may be secured by means of screws or rivets 28 as desired.

The lower end of the enclosure is provided with an apertured cap 29 which, when in position above the kettle 10, receives the spout 30 of the kettle as illustrated in FIG. 3.

The front corner or angle 31 of this base is provided with a discharge means 32, the purpose of which will hereinafter become apparent.

The unit 11 is supported for operation by means of the stand collectively designated 13.

In this embodiment, the stand is preferably made from angulated wire and is shown in detail in FIG. 6.

It includes an upper substantially horizontal cross bar 32A and a lower substantially horizontal cross bar 33.

Portions 34 extend downwardly from each end of the cross bar and then are angulated to form lower spaced and parallel base members 35. These then curve upwardly and forwardly to form spaced and parallel side members 36 and join the ends of the aforementioned upper cross bar 32A, the details being clearly shown in the drawings.

A clip 37 is secured to the rear wall 14 of the enclosure intermediate the ends thereof and the upper cross bar 32A is pivotally held by this clip with the base 29 resting on the lower cross bar 33 adjacent the front angled portion 16 of the enclosure and the positioning of the upper and lower cross bars 32A and 33 tilts the enclosure forwardly as clearly shown in FIGS. 1 and 3.

A spout 38 is pivotally supported also upon the front cross bar 33 and is positioned so that when the enclosure is resting on the lower cross bar 33, the discharge portion 32 of the base of the enclosure engages between the side walls 39 of the spout adjacent the upper end 40 thereof.

In operation, the unit is positioned together with the stand, upon the kettle 10 as clearly shown with the method of attachment of the unit to the stand permitting the device to be used with the majority of electric kettles.

The spout of the kettle engages immediately under the central aperture 40 of the base cover 29 so that when the water within the kettle is heated, steam from the kettle funnels upwardly from the spout into the enclosure and is guided through the funnel aperture 24 to within the condensing coil 17 which of course is connected to the source of cooling water by means of the conduits 20 and 22 as hereinbefore described.

Circulation of cooling water cools the steam passing upwardly through the coil 17 and causes same to condense and to be collected by the walls of the container and the intermediate baffle 23 thereof.

Due to the fact that the container is tilted forwardly as clearly shown and described, the condensate is collected by the channel formed by the front angled portion 16 of the casing and runs downwardly through the aperture 26 within the intermediate baffle 23 and to the discharge area 32 of the base 29 to be collected by spout 38 and deposited to a convenient container such as illustrated by reference character 41.

It is desirable that the water within the kettle be replenished from time to time but, the preferred embodiment shows means for automatically replacing water evaporated by the kettle.

It consists of a reservoir 42 connected at the upper end thereof to the discharge conduit 22 of the condensing coil 17.

An overflow outlet 43 is provided through the side of the wall of the reservoir towards the upper end 44 thereof so that water fills the reservoir and then overflows through a further discharge conduit 22B connected thereto.

A feed conduit 45 extends from the base of the reservoir 42 and is connected to an internal feed conduit 46 which extends through the wall of the enclosure with the first mentioned feed conduit 45 having an adjustable valve 47 so that the amount of water entering feed conduit 46, may be controlled.

This feed conduit 46 discharges just above the spout 30 of the kettle so that by adjustment of the valve 47, an amount of water may be fed to the kettle equal to the amount being evaporated thereby so that the water level within the kettle is maintained.

Since various modifications can be made in my invention as hereinbefore described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A continuous distilling unit for use with a source of steam from a vessel containing water and including a spout through which steam is discharged when the water within the vessel is heated, and a flowing source of circulating cooling water; comprising in combination an enclosure, means to support said enclosure whereby same extends upwardly above the associated spout, steam entry means at the base of said enclosure for receiving steam from said spout, the upper end of said enclosure being closed, a condensing coil supported within said enclosure above said steam entry means, means to operatively connect said condensing coil to the source of circulating cooling water and means to collect condensate from said condensing coil, at the base of said enclosure and to discharge same therefrom, said enclosure being substantially triangular when viewed in plan, and including a rear wall and a pair of side walls extending from the side edges of said rear wall and converging to a common angled junction forming the front of said enclosure, said enclosure being inclined forwardly when in situ whereby said angled junction acts as a trough to collect condensate and channel same to said means to discharge condensate therefrom, said base being apertured and engaging over the spout of said vessel, said last mentioned means including said base being inclined downwardly and away from the aperture over the spout, and including condensate discharge means at the lowermost point thereof.

2. The unit according to claim 1 which includes an apertured plate spanning said enclosure and spaced upwardly from said base and below said condenser coil, said aperture being over the spout of the vessel and opening into the center of said condenser coil whereby steam passes upwardly through said coil.

3. The unit according to claim 2 which includes means to convey a proportion of said cooling water to the associated vessel to replace water evaporated thereby, said last mentioned means including a reservoir, said discharge end of said condensate coil being operatively connected and discharging into said reservoir, an overflow discharge from said reservoir to control the level of water within said reservoir, and a conduit extending from said reservoir below said overflow discharge and extending to the associated vessel, and adjustable valve means to control the volume of water flowing through said last mentioned conduit.

4. The unit according to claim 2 in which said means to support said enclosure includes a stand, said stand including an upper cross bar and a lower cross bar, means pivotally attaching said rear wall of said enclosure to said upper cross bar, and a discharge spout supported by said lower cross bar, the base of said enclosure adjacent said angled junction, resting on said lower cross bar with said condensate discharge means operatively engaging said discharge spout.

5. The unit according to claim 2 which includes means to convey a proportion of the cooling water to the associated vessel to replace water evaporated thereby, said means comprising a conduit extending to said spout from the discharge end of said condenser coil.

6. The unit according to claim 5 in which said means to support said enclosure includes a stand, said stand including an upper cross bar and a lower cross bar, means pivotally attaching said rear wall of said enclosure to said upper cross bar, and a discharge spout supported by said lower cross bar, the base of said enclosure adjacent said angled junction, resting on said lower cross bar with said condensate discharge means operatively engaging said discharge spout.

7. The unit according to claim 1 which includes means to convey a proportion of the cooling water to the associated vessel to replace water evaporated thereby, said means comprising a conduit extending to said spout from the discharge end of said condenser coil.

8. The unit according to claim 7 in which said means to support said enclosure includes a stand, said stand including an upper cross bar and a lower cross bar, means pivotally attaching said rear wall of said enclosure to said upper cross bar, and a discharge spout supported by said lower cross bar, the base of said enclosure adjacent said angled junction, resting on said lower cross bar with said condensate discharge means operatively engaging said discharge spout.

9. The unit according to claim 1 in which said means to support said enclosure includes a stand, said stand including an upper cross bar and a lower cross bar, means pivotally attaching said rear wall of said enclosure to said upper cross bar, and a discharge spout supported by said lower cross bar, the base of said enclosure adjacent said angled junction, resting on said lower cross bar with said condensate discharge means operatively engaging said discharge spout.

10. The unit according to claim 9 which includes means to convey a proportion of said cooling water to the associated vessel to replace water evaporated thereby, said last mentioned means including a reservoir, said discharge end of said condensate coil being operatively connected and discharging into said reservoir, an overflow discharge from said reservoir to control the level of water within said reservoir, and a conduit extending from said reservoir below said overflow discharge and extending to the associated vessel, and adjustable valve means to control the volume of water flowing through said last mentioned conduit.

11. The unit according to claim 1 which includes means to convey a proportion of said cooling water to the associated vessel to replace water evaporated thereby, said last mentioned means including a reservoir, said discharge end of said condensate coil being operatively connected and discharging into said reservoir, an overflow discharge from said reservoir to control the level of water within said reservoir, and a conduit extending from said reservoir below said overflow discharge and extending to the associated vessel, and adjustable valve means to control the volume of water flowing through said last mentioned conduit.

* * * * *